March 31, 1942.    C. H. H. RODANET    2,278,217
SECURING DEVICE UTILIZING THE RESILIENT DISTORTION AND
INCOMPRESSIBILITY OF RUBBER
Filed Oct. 22, 1940    2 Sheets-Sheet 1
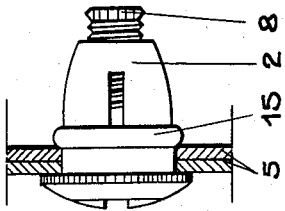
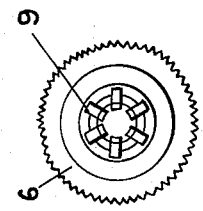
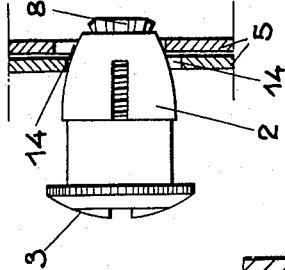
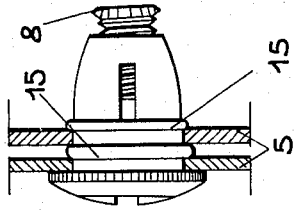
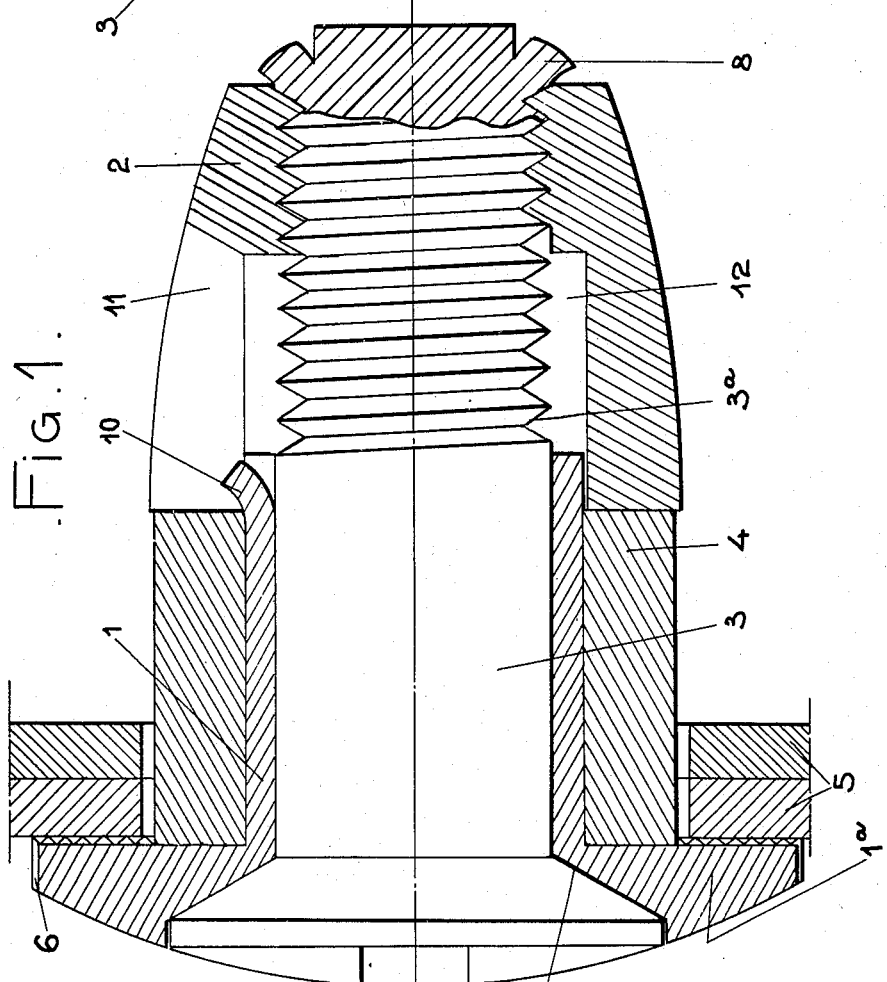
INVENTOR:
CHARLES HILAIRE HENRI RODANET
BY *Haseltine, Lake & Co.*
ATTORNEYS March 31, 1942.　　C. H. H. RODANET　　2,278,217
SECURING DEVICE UTILIZING THE RESILIENT DISTORTION AND
INCOMPRESSIBILITY OF RUBBER
Filed Oct. 22, 1940　　2 Sheets-Sheet 2
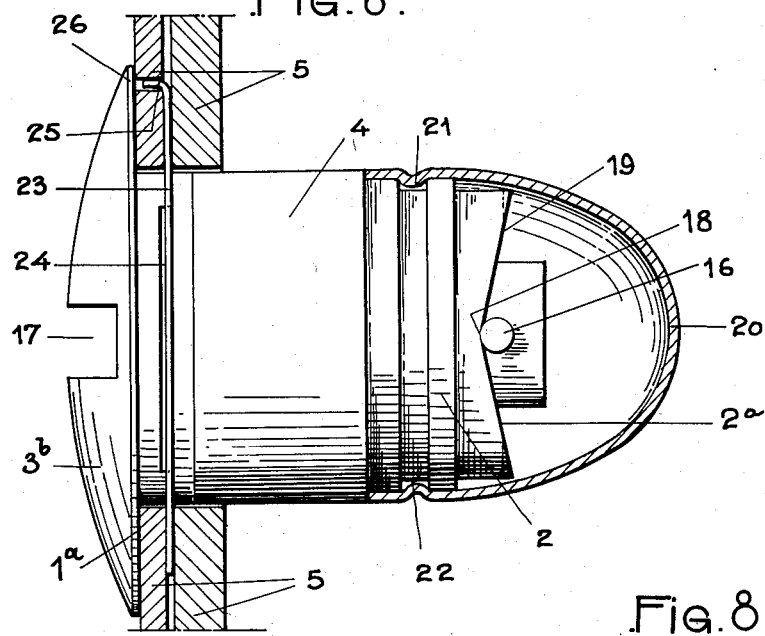
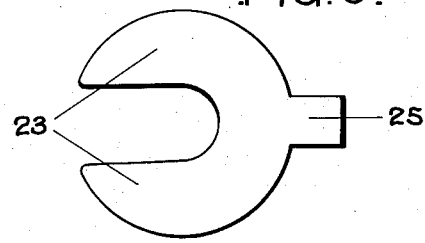
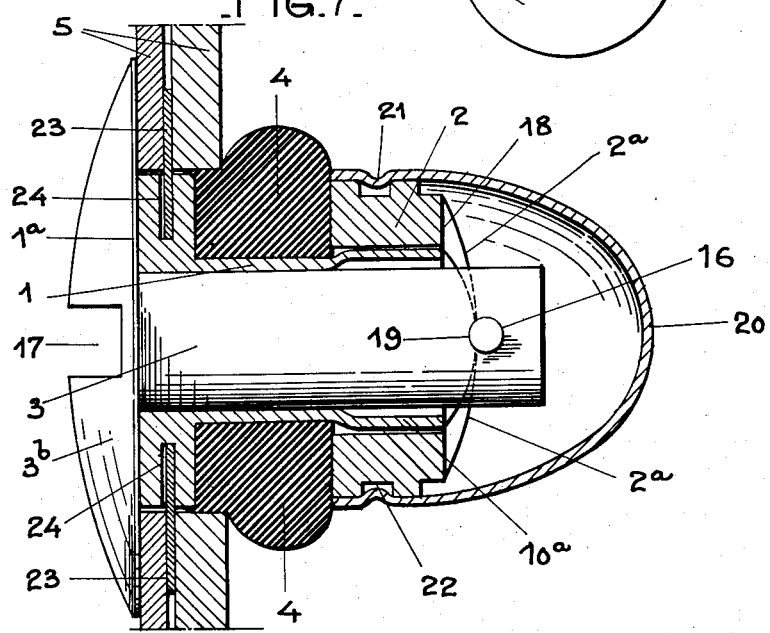
INVENTOR:
CHARLES HILAIRE HENRI RODANET
BY Haseltine Lake & Co.
ATTORNEYS Patented Mar. 31, 1942

2,278,217

UNITED STATES PATENT OFFICE 2,278,217

SECURING DEVICE UTILIZING THE RESILIENT DISTORTION AND INCOMPRESSIBILITY OF RUBBER

Charles Hilaire Henri Rodanet, Neuilly-sur-Seine, France, assignor to Société Anonyme: Jaeger-Aviation, Levallois-Perret, France Application October 22, 1940, Serial No. 362,232
In France October 30, 1939

8 Claims. (Cl. 85—2.4)

The present invention relates to a securing device applicable in particular to the joining of panels or sheet metal plates one of which only is accessible on one of its faces. This device utilizes the properties of rubber: resilient distortion and incompressibility. It is of the type comprising a rubber ring interposed between two rigid members so as to constitute a unit which is inserted through opposite holes of juxtaposed panels or sheet metal plates, in such a manner that, by bringing together said members by means of a screw and nut system, the rubber is radially spread out and forms peripheral projections which ensure the joining of the panels whilst bracing them if they are not contiguous.

The invention is adapted to improve devices of this type particularly with a view of simplifying the construction and of facilitating and accelerating the placing in position thereof. For that purpose, the invention is mainly characterized by the fact that the fixed member on which the tubular rubber block is permanently mounted and which serves as guide bearing and axial abutment for the screw displacing the movable member which forms the nut crushing said block, comprises a base provided with the means with which it can be anchored on the first of the panels or sheet metal plates to be secured.

Concerning the embodiments for carrying out the above mentioned feature, the invention is moreover characterized by the following points:

(a) The movable nut member is connected to the fixed member by an arrangement of the key and groove type or its equivalent which renders it angularly rigid with said fixed member, whilst leaving it free in the axial direction.

(b) The end of the threaded shank of the screw extends beyond the front face of the movable nut member when the rubber block is completely relaxed, and comprises permanent retaining means which prevent the disengagement of said screw so that the device constitutes a unit the elements of which cannot be separated.

(c) The lateral surface of the movable nut member has a cross section increasing from the end so as to constitute a centering pin when it is forced through the holes formed in the sheet metal plates or panels to be secured.

(d) The anchoring of the fixed member on which the tubular rubber block is permanently mounted, is ensured by a yoke the branches of which engage in notches of said member and which comprise at least one claw entering a perforation formed in the first of the panels or sheet metal plates to be secured.

(e) The anchoring yoke is arranged on the side of the rear face of the first of the panels to be assembled, so as to also ensure the anchoring of the device, in the longitudinal direction on said first panel.

(f) The movable member the axial displacements of which relatively to the fixed member produce the crushing of the rubber block has its front face cut out so as to form a bearing incline for at least one projection of the rotating member which allows the securing device to be operated.

(g) The profile of the incline on the movable member is such that the compression and relaxation of the rubber block take place alternately when the rotating member is subjected to a rotation in any direction whatever.

(h) Over the movable member is permanently fitted a capsule of ogival or like shape the insertion of which, through the perforations formed in the panels or sheet metal plates to be assembled, automatically produces the centering of said perforations.

The accompanying drawings illustrate by way of example only two embodiments of a securing device according to the invention.

Figs. 1 to 5 relate to a first embodiment.

Fig. 1 is a general axial section of the device, shown on an enlarged scale.

Figs. 2, 3 and 4 illustrate an external view of the device, for two different cases of utilization.

Fig. 5 is an end view seen from the front of the device.

Figs. 6 to 8 relate to a second embodiment.

Fig. 6 shows, on an enlarged scale, a general elevation of the device, the rubber block being relaxed and the centering capsule being illustrated in section.

Fig. 7 is a horizontal axial section of the device, the rubber block being crushed.

Fig. 8 shows, on a smaller scale, a front view of the anchoring yoke of the fixed member of the device.

As shown in Fig. 1, the device, in a first embodiment, comprises:

A fixed member 1, a movable nut member 2, a screw 3, a tubular block of rubber 4 permanently mounted on a cylindrical bearing of member 1 and abutting at one end on a base 1ª. This base extends beyond the edge of the rubber block 4 and is provided, on its front face, with anchoring projections on the outer face of the first of the panels or sheet metal plates 5 to be secured. In the example illustrated, said projections are constituted by the projecting points of teeth 6 peripherally cut out on the base 1ª (Figs. 1 and 5). The screw 3 is guided in the bore of member 1 and axially abuts on said member by pressing its head on a conical bearing 7. Its threaded shank 3ª is screwed in an internal screw thread of the nut member 2 and its end, still projecting relatively to the front face of member 2, even when the rubber block 4 is relaxed, is, according to the invention, provided with stop means. These means are advantageously those illustrated in the drawings and are constituted by radial claws 8 outwardly bent down by impressing the end of a suitable tool on the edge of the end face of the screw. The impressions of the tool are shown at 9 in Fig. 5.

The nut member 2 is connected to the fixed member by an arrangement of the key and groove type or its equivalent which, in the embodiment contemplated, is simply obtained by pushing in and stamping outwardly a claw 10 on the extreme edge of the tubular part of member 1, said claw engaging in a longitudinal groove 11 of the nut member 2. The latter comprises, as shown, a bore 12 in which the tubular part 1 engages in proportion as the rubber block 4 is crushed.

The outer surface of the nut member has a cross section increasing from its front end. It can have, for instance, the shape of an olive illustrated.

When the device is used, the rubber block being relaxed it is axially forced through the holes 14 formed in the panels 5 to be secured (Fig. 2) and the olive shape of the nut member 2 automatically determines the centering of the holes 14 if the latter are not already exactly centered. The device being pushed home, the points 6 press against the adjacent panel in which they become anchored, so much the more as the screw-driver for operating the screw 3 keeps them constantly pushed. The screw freely rotates relatively to members 1 and 2, prevented from rotating, and the rubber block 4, axially pressed, spreads out at 15 in the known manner and ensures the securing in position (contiguous panels 5 of Figs. 2 and 3) or both the securing in position and the bracing (distant panels 5 of Fig. 4).

As in the embodiment which has just been described, the embodiment of Figs. 6 to 8 comprises a tubular rubber block 4 forced on the cylindrical body of the fixed member 1 and arranged to be crushed between the base 1ª of the latter and the movable member 2.

The movable member 2 can slide on an extension of the body 1 and it is angularly connected to the latter by an assemblage of the key and groove type. In the embodiment illustrated, the keys are constituted by longitudinal projections or embossed parts 10ª of the tubular wall 1.

The movable member 2 is provided, on its front face, with an incline 2ª on which press one or more projections rigid with the rotating or operative member 3ª. In the embodiment illustrated, said projections are constituted by the ends of a pin 16 engaged in a diametral hole of the shank 3. The head 3ᵇ of the operative member presses against the base 1ª and comprises a groove 17 for a tool of the screw-driver type.

The incline 2ª is preferably continuous and has for instance two low points 18 and two high points 19 diametrally opposed two by two. When the pin 16 presses against the incline 2ª at the low points 18, the rubber block 4 is relaxed (Fig. 6); it is compressed (Fig. 7) when the pin 16 presses against the high points 19. Grooves can be formed at said high points for retaining the pin 16 and preventing accidental displacements thereof.

A capsule 20 stamped out in a sheet of metal, and having a front part shaped in the form of an olive, ogive or the like, is engaged on the movable member 2 and secured on the latter for instance by means of grooves or projections 21 pushed into a groove 22. This form of construction ensures, when the securing device is forced through the sheet metal plates or panels 5 to be assembled, the automatic centering of the perforations for the passage of said device, formed in said panels.

The anchoring of the fixed member 1 on the first of the panels 5 to be assembled is obtained by means of a yoke 23 (Fig. 8) the branches of which are engaged in two opposite grooves 24 of the base 1ª. The position of the median plane of the grooves 24 is so chosen that the yoke 23, when it is placed in position, presses against the rear face of the first of the panels 5; it thus ensures the anchoring of the securing device, on said first panel, in the longitudinal direction. On the other hand, the yoke 23 is held stationary on the first panel 5 by bending down a claw or tongue 25 in the perforation 26 formed in said panel for preventing the rotation of the base 1ª or of the fixed member of the securing device, relatively to the panels to be assembled.

It will be seen, in the embodiment illustrated, that it suffices to cause the operative member 3 to rotate through a quarter of a revolution for passing from locked condition to free condition or vice versa.

What I claim as my invention and desire to secure by Letters Patent is:

1. In a securing device for assembling juxtaposed sheet metal plates or panels, a central rotating member, a tubular member mounted coaxially with said central member and comprising a base at one end, means for anchoring said base on the first of the panels to be assembled, a movable member adapted to axially slide without rotating relatively to the tubular member, a tubular block of rubber mounted on said tubular member so as to be crushed between the base of the latter and the movable member, and means for converting the rotation of the central member into longitudinal displacements of said movable member.

2. In a securing device for assembling juxtaposed sheet metal plates or panels, a central rotating member, a tubular member mounted coaxially with said central member for which it serves as bearing, a base at one end of said tubular member adapted to press against the outer face of the first of the panels to be assembled, projections on the bearing face of said base for holding it stationary on said panel, a movable member provided with an internally threaded hole in order to screw on a screw thread of the central rotating member, a connection of the key and groove type between said movable member and the tubular member for preventing it from rotating relatively to the latter, and a rubber block mounted on said tubular member so as to be crushed between the base of the latter and the movable member.

3. In a securing device for assembling juxtaposed sheet metal plates or panels, a central rotating member, a tubular member mounted coaxially with said central member for which it serves as bearing, a base at one end of said tubular member adapted to press against the outer face of the first of the panels to be assembled, projections on the bearing face of said base for holding it stationary on said panel, a movable member provided with an internally threaded hole in order to screw on a screw thread of the central rotating member, means at the end of said screw thread for preventing said screw thread from disengaging from the movable member, a connection of the key and groove type between said movable member and the tubular member for preventing it from rotating relatively to the latter, and a rubber block mounted on said tubular member so as to be crushed between the base of the latter and the movable member.

4. In a securing device for assembling juxtaposed sheet metal plates or panels, a central rotating member, a tubular member mounted coaxially with said central member for which it serves as bearing, a base at one end of said tubular member adapted to press against the outer face of the first of the panels to be assembled, projections on the bearing face of said base for holding it stationary on said panel, a movable member provided with an internally threaded hole in order to screw on a screw thread of the central rotating member, the lateral surface of said central rotating member being of olive shape for centering the panels to be assembled when it is forced through the holes formed in said panels, means at the end of said screw thread for preventing said screw thread from disengaging from the movable member, a connection of the key and groove type between said movable member and the tubular member for preventing it from rotating relatively to the latter, and a rubber block mounted on said tubular member so as to be crushed between the base of the latter and the movable member.

5. In a securing device for assembling juxtaposed sheet metal plates or panels, a central rotating member, a tubular member mounted coaxially with said central member for which it serves as bearing, a base at one end of said tubular member, a yoke adapted to straddle said base by engaging its branches in two opposite notches of said base and to press against the inner face of the first of the panels to be assembled, a tongue on said yoke adapted to be bent down into a perforation of said first panel in order to anchor said base on the latter, a movable member adapted to axially slide without rotating relatively to the tubular member, a tubular rubber block mounted on said tubular member so as to be crushed between the base of the latter and the movable member, and means for converting the rotation of the central member into longitudinal displacements of said movable member.

6. In a securing device for assembling juxtaposed sheet metal plates or panels, a central rotating member, a tubular member mounted coaxially with said central member for which it serves as bearing, a base at one end of said tubular member, a yoke adapted to straddle said base by engaging its branches in two opposite notches of said base and to press against the inner face of the first of the panels to be assembled, a tongue on said yoke adapted to be bent down into a perforation of said first panel in order to anchor said base on the latter, a movable member adapted to axially slide without rotating relatively to the tubular member anchored on the first panel, an incline at the front end of said movable member, at least one radial projection on the central rotating member and pressing against said incline for moving the movable member in translation when the central member is rotated, and a tubular rubber block mounted on said tubular member so as to be crushed between the base of the latter and the movable member.

7. In a securing device for assembling juxtaposed sheet metal plates or panels, a central rotating member, a tubular member mounted coaxially with said central member for which it serves as bearing, a base at one end of said tubular member, a yoke adapted to straddle said base by engaging its branches in two opposite notches of said base and to press against the inner face of the first of the panels to be assembled, a tongue on said yoke adapted to be bent down into a perforation of said first panel in order to anchor said base on the latter, a movable member adapted to axially slide without rotating relatively to the tubular member anchored on the first panel, an incline at the front end of said movable member, a diametral pin on the central rotating member and pressing against said incline for moving the movable member in translation when the central member is rotated, a capsule of ogival shape mounted at the front end of the movable member and a rubber block mounted on said tubular member so as to be crushed between the base of the latter and the movable member.

8. In a securing device as claimed in claim 7, an incline at the end of the movable member comprising two high points and two low points diametrally opposed two by two.

CHARLES HILAIRE HENRI RODANET.